July 2, 1940.　　　　　B. K. STUBER　　　　　2,206,735

CONSTANT VELOCITY JOINT

Filed Feb. 11, 1938

INVENTOR.
BERNARD K. STUBER
BY
ATTORNEY.

Patented July 2, 1940

2,206,735

UNITED STATES PATENT OFFICE 2,206,735

CONSTANT VELOCITY JOINT

Bernard K. Stuber, Detroit, Mich.

Application February 11, 1938, Serial No. 190,097

12 Claims. (Cl. 64—21)

This invention relates to universal joints of the constant velocity type and has for its object to provide a joint of this type which is sturdy and reliable in construction and free from the interposition of fragile parts, which is substantially perfect in maintaining the constant velocity relative between driving and driven members and which can compete in price with the conventional four bearing joint not having the advantage of constant velocity.

More particularly it is an object of this invention to provide a constant velocity joint employing pairs of trunnions, one of said pairs being housed by bushings, the other of said pairs being contained in grooves. Since the mere provision of the grooves for one pair of diametrically opposite trunnions will not, in itself, result in the constant velocity operation, a further and important object is to teach the displacement of centers of the two main joint members whereby constant velocity results.

Another object is to provide two main joint members and four trunnions therefor together with a choice of constructions in the location thereof and also with a choice of shapes of the intermediate members which resembles the ring in one conventional type of non-constant velocity joint.

Figure 1:
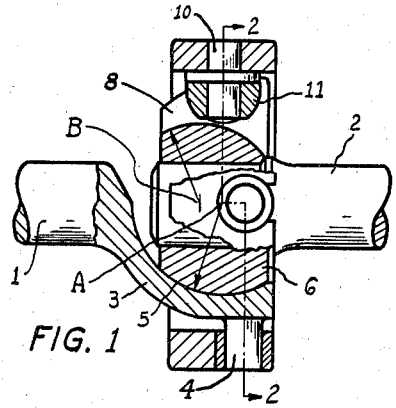
Figure 2:
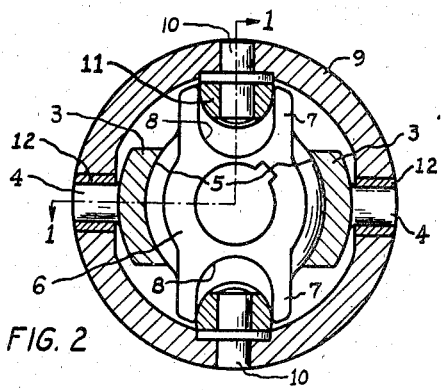
Figure 3:
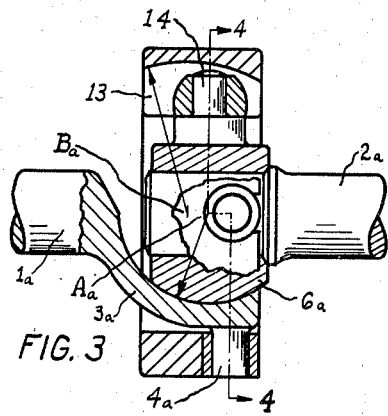
Figure 4:
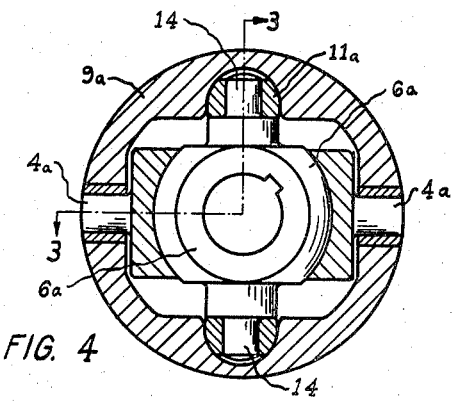
Figure 5:
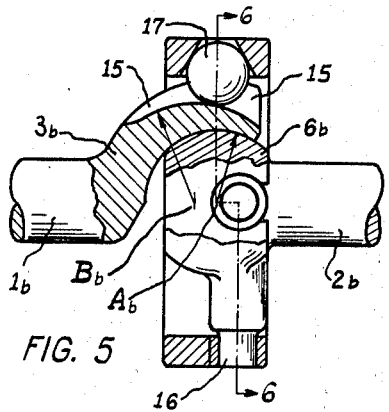
Figure 6:
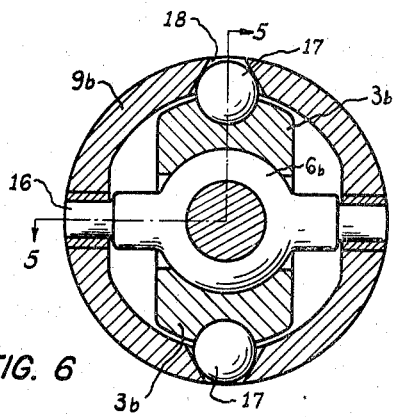

Other objects and advantages of my invention will become hereinafter more fully apparent as reference is had to accompanying drawing wherein my invention is illustrated by way of example and in which:

Fig. 1 is a diametric partially broken section of my improved universal joint taken along the line 1—1 of Fig. 2, but with one main member rotated through ninety degrees and with its companion trunnion and environment also shown, Fig. 2 is a transverse section taken along the line 2—2 of Fig. 1, Fig. 3 is a view similar to Fig. 1 taken along the line 3—3 of Fig 4, showing a modification, Fig. 4 is a section similar to Fig. 2, taken along the line 4—4 of Fig. 3, Fig. 5 is a section similar to Figs. 1 and 3 taken along the line 5—5 of Fig. 6, and Fig. 6 is a section similar to Figs. 2 and 4 taken along the line 6—6 of Fig. 5.

More particularly, 1 and 2 indicate main universal joint members, the member 1 being in the nature of a yoke member having two arms or branches 3, each of which has a trunnion 4 projecting outwardly therefrom, the trunnions being coaxial. The internal surfaces 5 of the trunnion arms are formed on the segment of a sphere having its center at the point A which is the center of the joint.

The surfaces 5 receive the external spherical surfaces of a member 6 which may be made individual or integral with the main member 2. The spherical surfaces of the member 6 do not extend therearound, but terminate in radially elongated branches 7 having grooves 8 formed therein, the grooves 8 being arcuate both in longitudinal and transverse section. The center 10 of the longitudinal arcs is at the point B which is removed from the point A.

In order to connect the main members 1, 2, 6, I provide a ring type member 9 having two trunnion pins 10 radiating inwardly thereof and each having a hemispherical bushing 11 journalled thereon for engagement with the grooves 8 of the member 6. The common axis of the pins 10 passes through the joint center A. At 90° spacings from the pins 10 bushings 12 are mounted in the ring member 9 in order to receive the trunnions 4. The common axis of the trunnions 4 does not pass through the joint center A, but is offset therefrom oppositely and equally from the center B.

In Figs. 3 and 4 a modification is shown wherein the parts are the same as previously described and are given the same numerals with the additional designation a in each case, except that the grooves 8 of Figs. 1 and 2 are formed at 13 in the ring member 9a and the trunnion pins 10 have now become the trunnions 14 carried by the member 6a. The center Aa is the joint center and the center Ba is the center of the arcs 13. The relation of the trunnion axes are as previously described.

In Figs. 5 and 6 a modification is shown in which the principle is the same but the grooves 15 are formed in arms 3b of the yoke member 1b, and the trunnions 16 are carried by the other main member 2b, 6b instead of by the yoke member as in the other two forms. The other two trunnion pins and spherical bushings may be replaced by two hard metal balls 17 which seat jointly in the ring member 9b at 18 and in the grooves 15, thus acting to connect the ring and yoke member and capable of shifting their wear surfaces during operation. The relation of the centers Ab and Bb and of the trunnion axes are as previously described.

What I claim is:

1. A universal joint comprising three members, two of said members being main members, the third one of said members being rotatable about an axis fixed with respect to one of said main members and about a second axis variable in position with respect to both of said main members, the first named axis being offset with respect to the joint center, the other of said axes always passing through the joint center.

2. A universal joint comprising two main members each having two spaced bearing members, the axes of the bearings of one of said members being offset from the axes of the bearing surfaces of the other of said members when said members are assembled together, means connecting said members for universal operation, and coacting surfaces on the two main members maintaining one of said axes passing through the center of the joint during universal operation thereof.

3. A universal joint comprising two main members each having two spaced axially alined bearing means, the axes of the bearing means of one of said members being offset from the axes of the bearing surfaces of the other of said members when said members are assembled together and connector means having four bearing members spaced circumferentially at ninety degrees for cooperation with the bearing means of said main members whereby said main members are connected in universal relation.

4. A universal joint comprising two main members and a third connector member, said connector member and one of said main members being connected by means of two trunnion and bushing assemblies separated by an arc of 180°, said connector member and the other of said main members being connected for relative rotation about an axis variable through an arc which lies in a plane normal to the axis of said trunnions.

5. A universal joint comprising two main members each having a pair of bearing surfaces spaced through 180°, and a third member having bearing surfaces and connecting said main members in such manner that the bearing surfaces of one of said members alternates with those of the other around the joint, the connection of said third member and one of said main members comprising a trunnion and bushing assembly, the connection of said third member and the other of said main members comprising a groove and groove fitting member.

6. A universal joint comprising two main members each having a pair of bearing surfaces spaced through 180°, and a third member having bearing surfaces and connecting said main members, the connection of said third member and one of said main members comprising a trunnion and bushing assembly, the connection of said third member and the other of said main members comprising arcuate grooves and groove following members.

7. A universal joint comprising two main members each having a pair of bearing surfaces spaced through 180°, and a third member having bearing surfaces and connecting said main members in such manner that the bearing surfaces of one of said members alternates around the joint with those of the other, the connection of said third member and one of said main members comprising a trunnion and bushing assembly, the connection of said third member and the other of said main members comprising two spaced arcuate grooves the base line of each of which is formed on arcs of a circle having its center removed from the axis of said trunnions, the arc of the base of said grooves lying in a plane containing the axis of one of said main members.

8. A universal joint comprising three members, two of said members being main members, the third one of said members being rotatable about an axis fixed with respect to one of said main members and about a second axis variable in position with respect to both of said main members, one of said main members having internal bearing surfaces, the other of said main members having bearing contact with said internal surfaces.

9. A universal joint comprising a main yoke member having trunnions extending outwardly from the arms thereof, the interior surface of said yoke being arcuate and constituting a bearing surface, a second main member having an arcuate bearing surface engaging the interior of said yoke member, said second main member having spaced bearing means, and a connector member having bearing means for operative connection to trunnions of said yoke member and bearing means of said second main member, the connection between said connector and said second main member comprising grooves and groove following members.

10. A universal joint comprising three members, two of said members being main members, the third one of said members being rotatable about an axis fixed with respect to one of said main members and about a second axis variable in position with respect to both of said main members, one of said main members having internal bearing surfaces, the other of said main members having bearing contact with said internal surfaces, the center of said surfaces constituting the joint center and being spaced from all points of said fixed axis.

11. A universal joint comprising a main yoke member having trunnions extending outwardly from the arms thereof, the interior surface of said yoke being arcuate and constituting a bearing surface, a second main member having an arcuate bearing surface engaging the interior of said yoke member, said second main member having spaced bearing grooves therein extending in the general direction of the axis thereof, and a connector member having two trunnions each equipped with a hemispherical bushing extending inwardly thereof for engagement with said grooves, the axis of the first mentioned trunnions being offset from the axis of said hemispherical trunnions.

12. A universal joint comprising a main yoke member having trunnions extending outwardly from the arms thereof, the interior surface of said yoke being arcuate and constituting a bearing surface, a second main member having an arcuate bearing surface engaging the interior of said yoke member, said second main member having spaced bearing grooves therein extending in the general direction of the axis thereof, and a connector member having two trunnions each equipped with hemispherical bushing extending inwardly thereof for engagement with said grooves, the center of said interior arcuate surface being the center of the joint, one of said axes being offset from the center of the joint, the other of said axes passing through said joint center, the center of the arc of said grooves being offset from said joint set oppositely to said offset axis.

BERNARD K. STUBER.